July 15, 1958  R. W. TRIPP  2,843,811
THREE DIMENSIONAL MACHINE CONTROL SERVOSYSTEM
Filed Sept. 5, 1956  8 Sheets-Sheet 6

ROBERT W. TRIPP,
  INVENTOR.
BY W. E. Beatty
  ATTORNEY.

July 15, 1958 R. W. TRIPP 2,843,811
THREE DIMENSIONAL MACHINE CONTROL SERVOSYSTEM
Filed Sept. 5, 1956 8 Sheets-Sheet 7
Fig. 7.
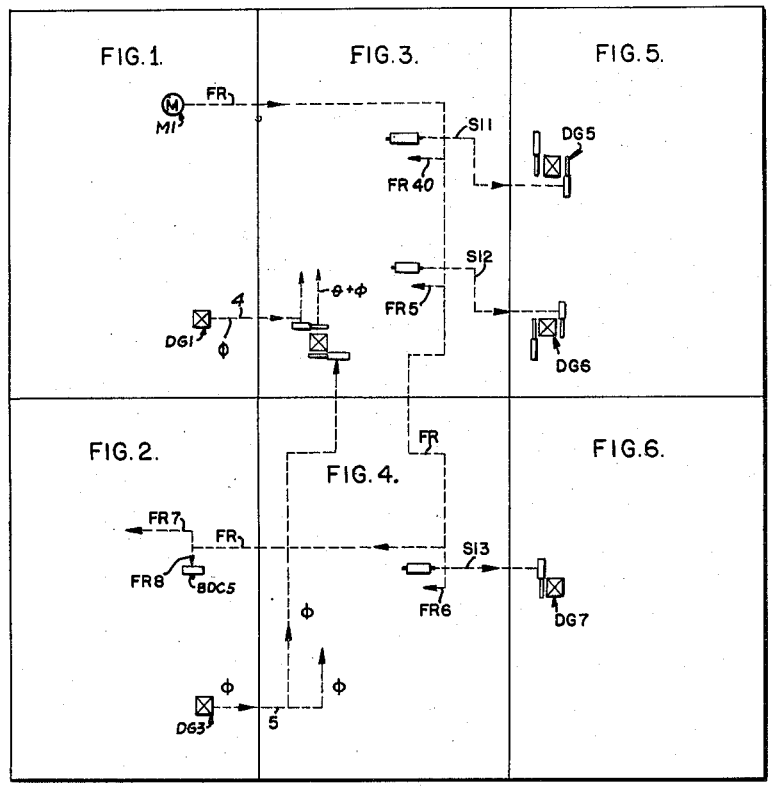
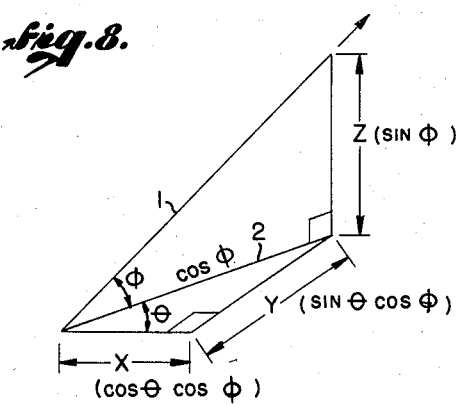
Fig. 8.
ROBERT W. TRIPP,
INVENTOR.
BY W. E. Beatty
ATTORNEY.

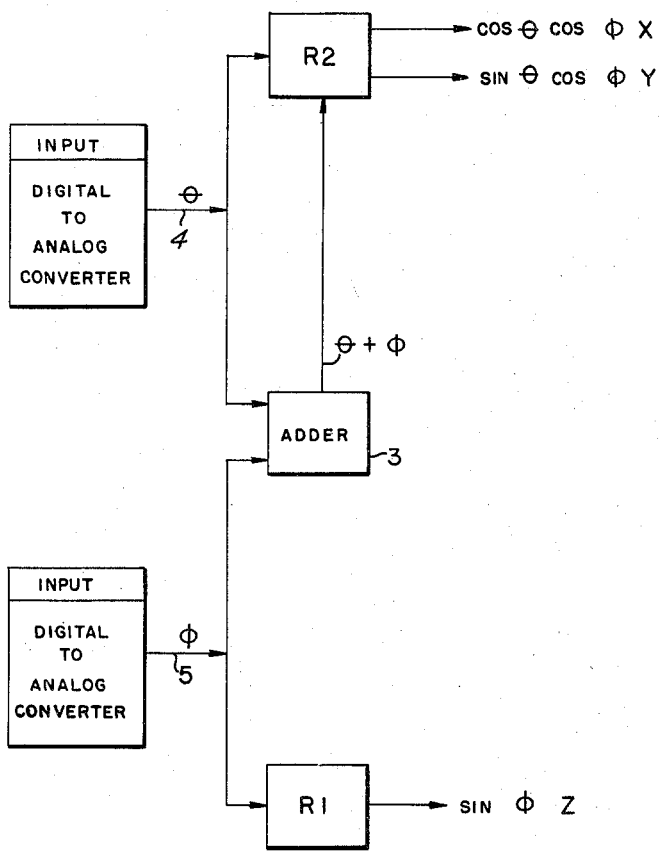

United States Patent Office 2,843,811
Patented July 15, 1958

2,843,811

THREE DIMENSIONAL MACHINE CONTROL SERVOSYSTEM

Robert W. Tripp, Bronxville, N. Y., assignor, by mesne assignments, to Inductosyn Corporation, Carson City, Nev., a corporation of Nevada Application September 5, 1956, Serial No. 608,024

12 Claims. (Cl. 318—19)

The invention relates to three dimensional machining position control and more particularly to providing a digital input of values characteristic of a tool path in three dimensions, converting the input to analog values and controlling three mutually perpendicular machine element drives to drive a tool or other driven element along a path in space as defined by the input.

An object of the invention is to provide a three dimensional control for driving a driven element such as a tool along a path having one or more of the following characteristics, namely, slope, curvature and rate of change of curvature.

A further object of the invention is to provide, for the tool or the like, machine elements movable along orthogonal X, Y and Z axes, with provision for driving these machine elements at feed rates and with provision for integrating the feed rates according to components of the path defined by the input data.

A further object of the invention is to provide a component solver for determining the X and Y components of the path from values of angle $\theta$ representing the slope angle of the path component in the X, Y plane and from values of angle $\phi$ representing the slope of the path above or out of the X, Y plane.

Other objects of the invention are to reduce the amount of input data required, machine along smooth continuous paths having any desired slope, curvature or rate of change of curvature, reduce the computational effort required for programming and obtain a high degree of positional control accuracy.

The present application discloses machine control methods and systems, in so far as two dimensions are concerned, which are disclosed and claimed in application Serial Number 557,035, filed January 3, 1956, for Automatic Machine Control Method and System, the instant application being an extension of Ser. No. 557,035 to three dimensions.

The present application also discloses a digital-to-analog converter including a computer of angular values corresponding to the sum of selected angles, which is disclosed and claimed in application Ser. No. 540,429, filed October 14, 1955, for Automatic Machine Control, and Ser. No. 540,748 referred to hereafter. The above patent applications are assigned to the assignee hereof and reference may be made to them for further details of the above features and various other features disclosed herein including the following, digital input, digital-to-analog converter, variable gear ratio and its use for obtaining a shaft speed as determined by the input of the rate of curvature change and the use of such shaft speed for modifying the feed rate as determined by the slope control, such feed rate being also modified by the curvature control. Also application Ser. No. 557,035 discloses and claims the rate of curvature change in octal form and its conversion to binary form, together with controlling the operation of the binary gear device in timed relation with the program advance, the program or input data for example being in the form of a record such as holes in a tape. Application Ser. No. 557,035 also discloses and claims the feature of preventing the feed rate motor from operating the X and Y drives in accordance with the rate of change of curvature data, at times when either the slope control or the curvature control are in the transitory stage of advancing to new positions called for by their respective input data, whereby the X and Y drives are prevented from acting under the influence of only a part of the various input data, these drives acting only when all items of input data are conditioned to exert their joint influence as called for by all items of the input. While this may be used, preferably according to the present invention the feed rate drive is constantly active.

The application Ser. No. 557,035 also discloses and claims the feature of preventing the X and Y drives from operating during the above-mentioned transitory stages when there is an advance from one set of input data to another, when this advance is brought about either manually, or automatically, by the card reader. This was accomplished by converting the slope input data and curvature input data into error signals, as usual in servo control, to position the corresponding slope and curvature controls, and by disabling the feed rate drive until both of these error signals were reduced to null. According to the present invention, the feed rate drive is maintained in continuous operation while successive bits of input data are adding their instructions to the $\theta$ and $\phi$ shafts.

Application Ser. No. 557,035 also discloses and claims a feed rate resolver for resolving the combined analog values of the various path elements into space quadrature drives for the machine X and Y elements, by using these analog values to control the shaft of a resolver having co-function outputs in the relation of sine and cosine, the latter being integrated with the feed rate for controlling the speed ratio of the X and Y machine drives. The present invention also extends this control, of the feed rate resolver, to three dimensions.

The feature of positioning or rotating the shaft of the feed resolver to position or move the linear machine drives with great accuracy is accomplished by employing a rotary or linear embodiment of the Inductosyn as the coarse and/or fine data element in servo systems controlled by these data elements. Rotary, coarse and fine data elements are used for controlling the shaft of the feed resolver, while fine data linear elements are used for controlling the machine drives. The coarse data element may be a conventional two-pole resolver or it may be an Inductosyn or position measuring transformer of the type described and claimed in patent application Ser. No. 536,464, filed September 26, 1955, by R. W. Tripp, for Microsolver, the fine data element being preferably a position measuring transformer of the type described in patent application S. N. 509,168, filed May 18, 1955, by R. W. Tripp and J. L. Winget, for Position Measuring Transformer, both cases being assigned to the assignee of the present application.

Such Inductosyn or transformers may comprise two inductively related metallic conductor patterns on glass members movable with respect to each other, one fastened to each of the machine elements whose relative positions or motions are to be controlled. One member bears a continuous winding in the form of a multiplicity of conductors disposed in a plane parallel to the direction of relative motion of the members, the conductors extending transversely of that direction. The conductors are connected into a single series circuit so that adjacent portions carry current in opposite directions transversely of the length of the array. The second member bears two windings similar to the winding of the first member but usually shorter and disposed with respect to each other in space quadrature of the cycle defined on the continuous winding of the first member by the separation, center to center, of three adjacent conductors of that winding, the separation being taken in the direction of relative motion of the two members. The members are supported for relative motion with their windings at a small and constant separation, and the design of the windings is preferably such that the voltage induced in any of them by a current in a winding of the other member is a substantially sinusoidal function of the relative position of the members, cyclical in a change of relative position of the members equal to this pole cycle.

The Inductosyn is similar in action to a resolver, but having a larger number of poles. The pole pair spacing of the linear Inductosyn may be one-tenth inch which corresponds to 360 electrical degrees. Experience indicates that it is possible to control positioning to an electrical angle of one milliradian which is equivalent to four seconds of arc on a 54-pole rotary Inductosyn and is also equivalent to $\frac{1}{6280}$ of one-tenth inch, or approximately 16 microinches on the linear Inductosyn.

As applied to two dimensional control, the features of zero offset, and program advance control are disclosed and claimed in application S. N. 557,035, and in S. N. 638,722, filed February 7, 1957 by R. W. Tripp, for Zero Offset for Machine Tool Control.

For further details of the invention, reference may be made to the drawing wherein, Fig. 1 is a schematic diagram of various kinds of input data characteristics of a tool path, also feed rate input data, and a digital-to-analog converter for converting such data to analog values of the angle $\theta$ representing the angle of the component of the tool path in the X, Y plane, as indicated in Fig. 8.

Figure 4:
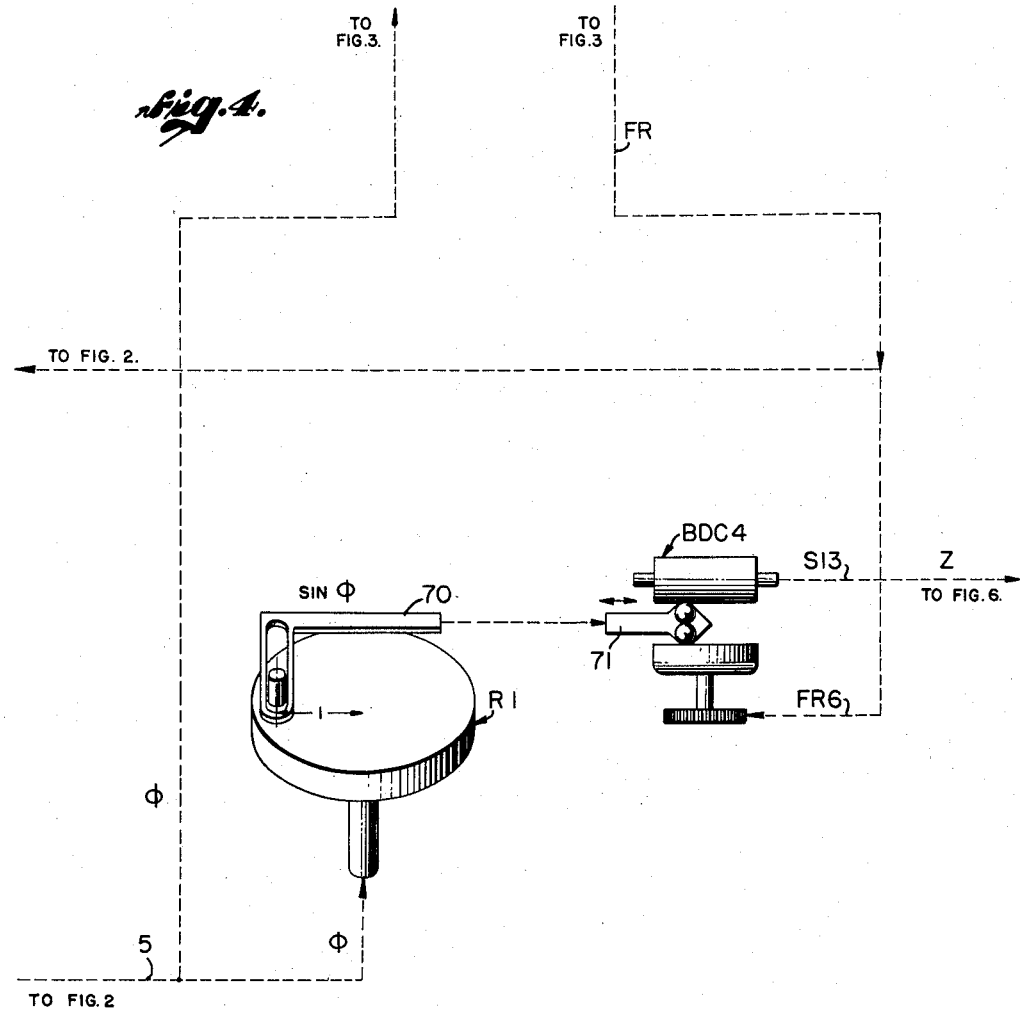

Fig. 4 schematically illustrates a resolver having an input $\phi$ and a feed rate integrator therefor.

Figure 1:
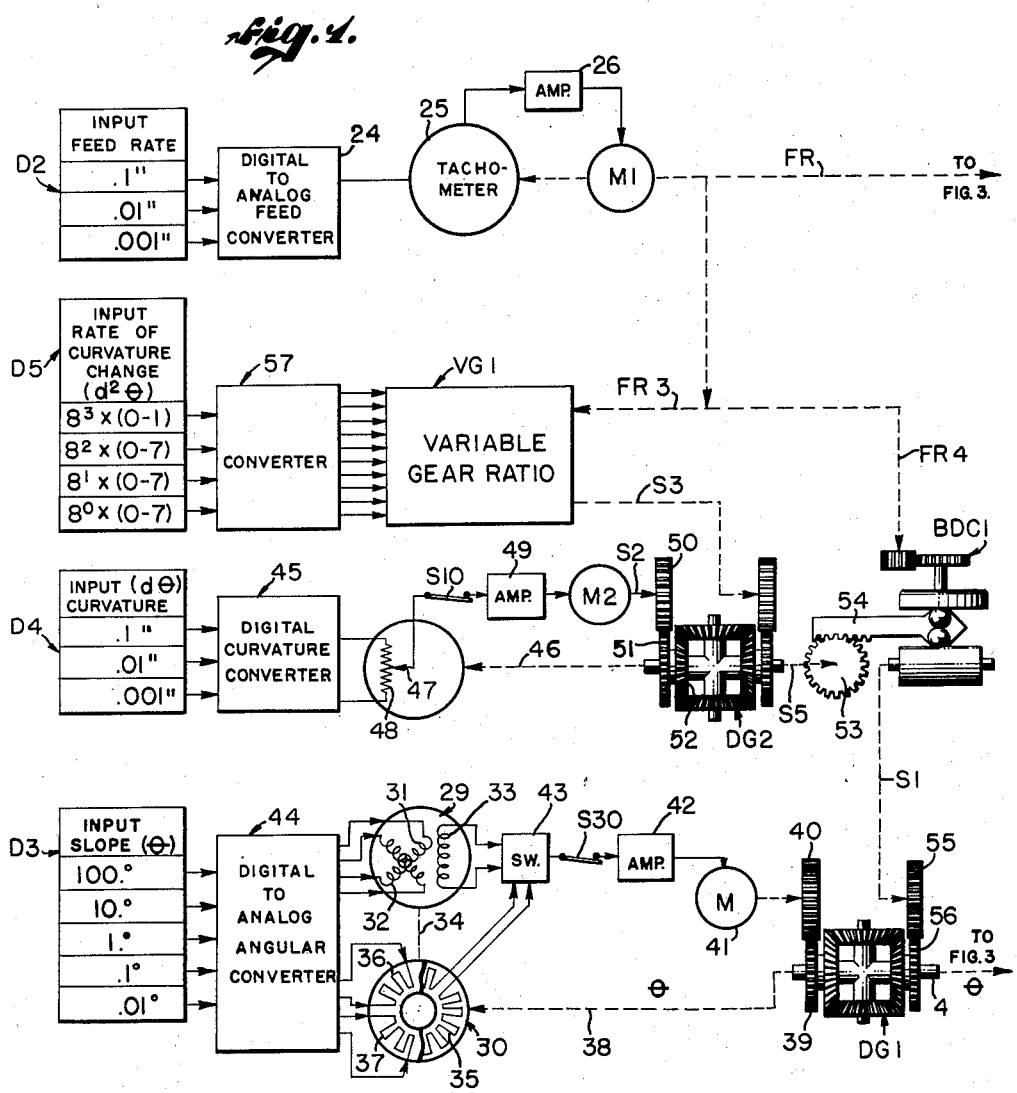
Figure 2:
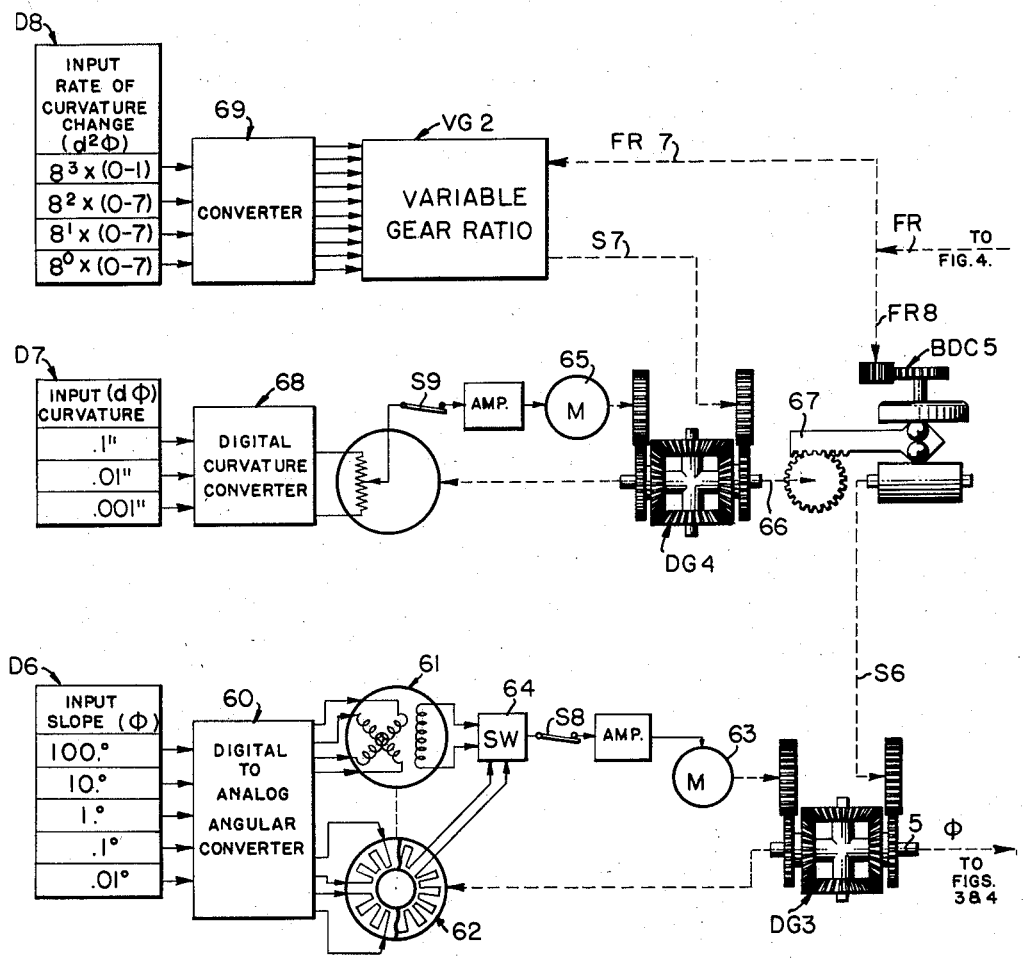
Fig. 2 is a similar schematic diagram of input data characteristic of the tool path and a digital-to-analog converter providing analog values of the angle $\phi$ representing the angle of the tool path above the X, Y plane, that is in a plane containing the tool path and the Z axis at right angles to the X, Y plane.
Figure 3:
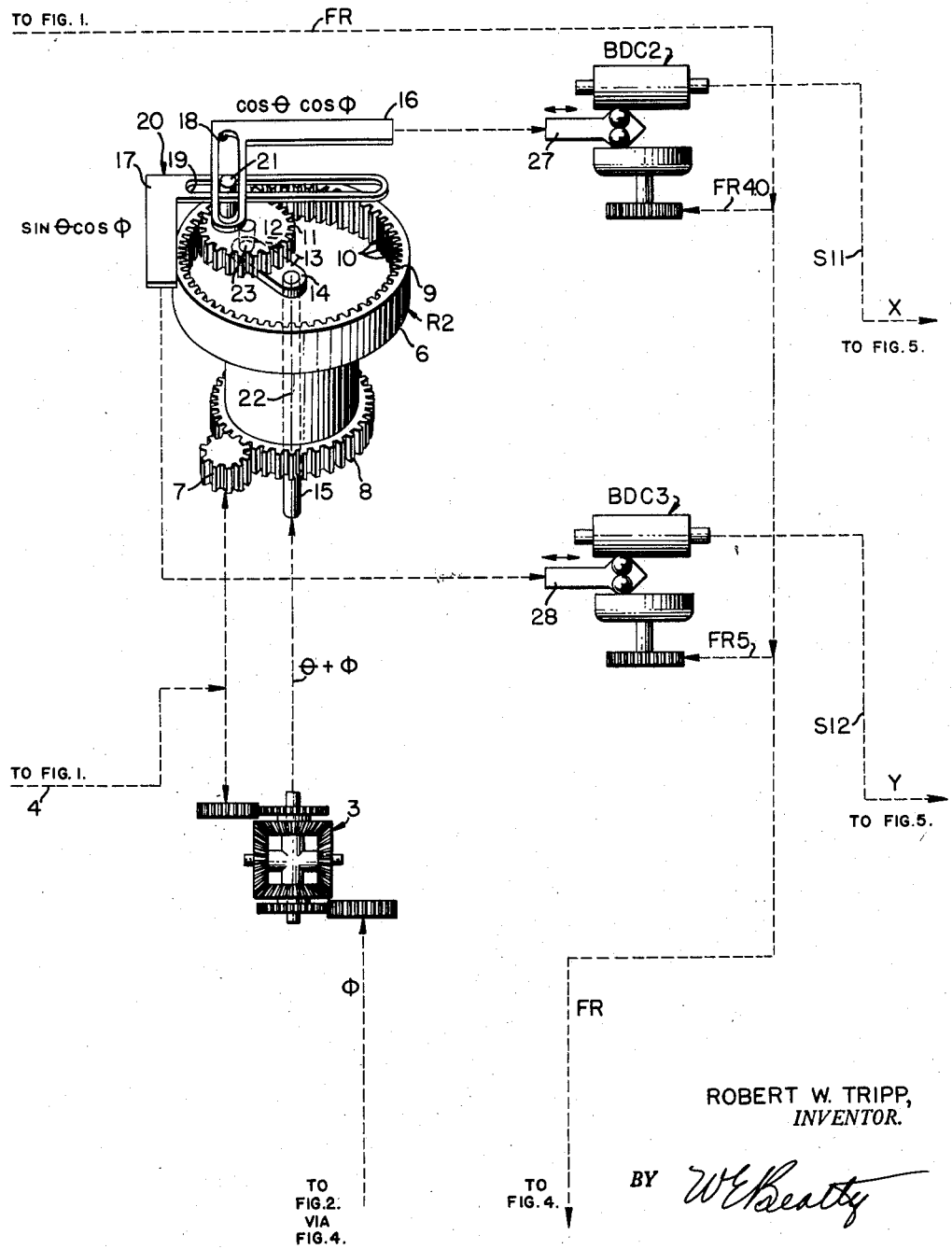
Fig. 3 is a schematic diagram showing schematically in perspective a component solver having inputs of $\theta$ and $\theta + \phi$ and outputs of $\sin \theta \cos \phi$ and $\cos \theta \cos \phi$ with integrators for integrating the feed rate with such components.
Figure 5:
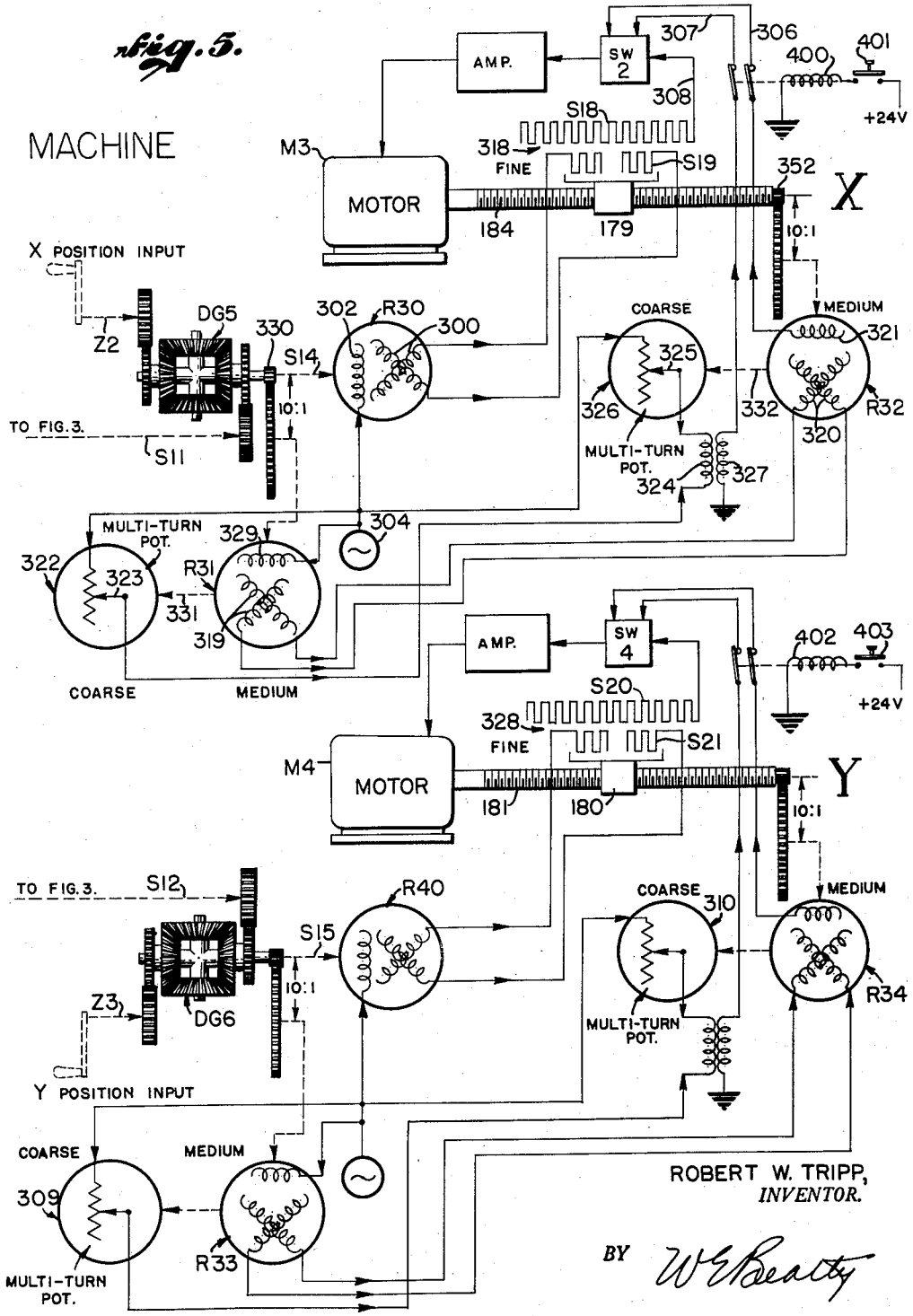

Fig. 5 is a schematic diagram having as inputs the X and Y position shaft inputs from Fig. 3, and a zero offset input, with coarse, medium and fine transmitter and receiver elements controlled thereby for servoing the X and Y machine elements, a program advance for the switches shown Figs. 1 and 2 also being illustrated.

Figure 6:
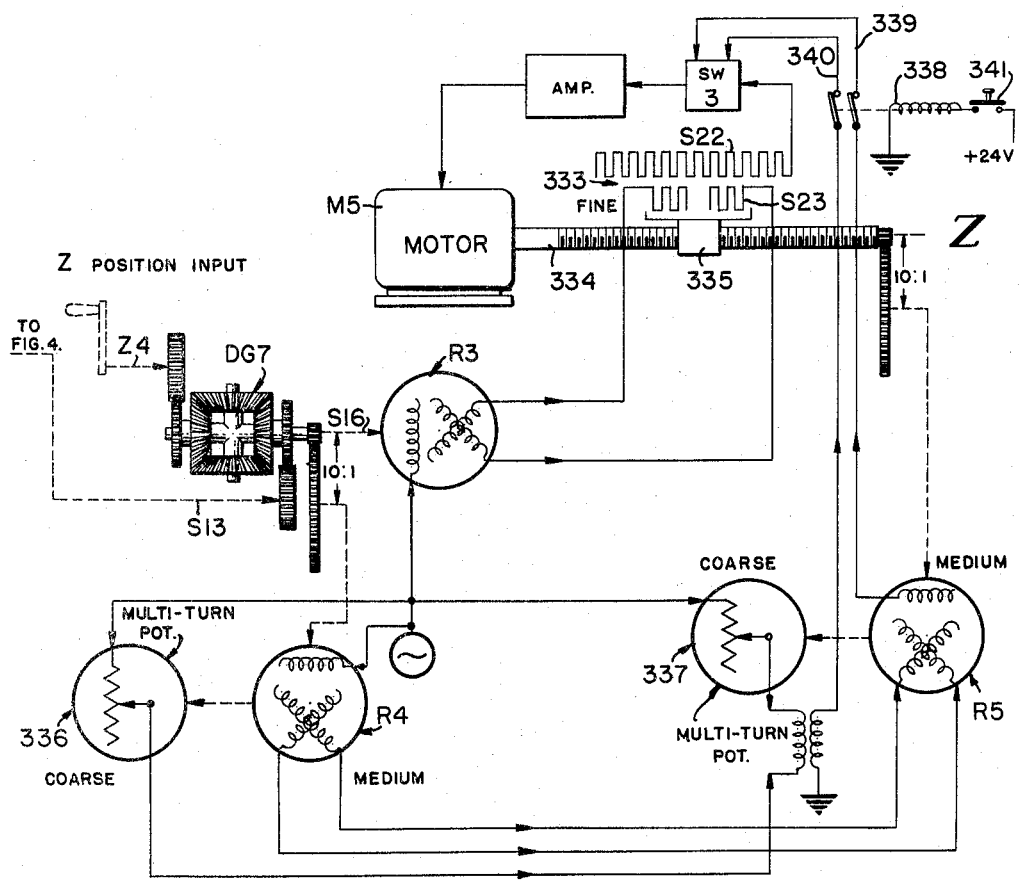

Fig. 6 is a schematic diagram of a shaft input from Fig. 4, also a zero offset input controlling transmitters and receivers in coarse, medium and fine increments for servoing the Z machine element.

Fig. 7 is a schematic diagram showing how Figs. 1 to 6 fit together to show the complete three dimensional control.

Fig. 8 is a schematic diagram showing the tool path indicated as unity, its component in the X, Y plane and its angles $\theta$ and $\phi$ and its components on the X, Y and Z axes.

Fig. 9 is a schematic block diagram illustrating the mathematical operations performed on the shaft rotation outputs of Figs. 1 and 2, with the use of the component solver and adder of Fig. 3 for producing shaft outputs characteristic of the X, Y and Z components of the tool path.

Referring in detail to the drawings, as shown in Fig. 8, the tool path 1 is illustrated with reference to the three dimensional coordinate axes X, Y, and Z, the angle $\theta$ representing the angle between the X axis and the tool path component 2 in the X, Y plane while the angle $\phi$ represents the angle that the tool path 1 is or extend above or out of the X, Y plane. The invention provides means for supplying analog values of $\theta$ and $\phi$ and means for resolving these angles into their components X, Y and Z according to the following formulae, the tool path being considered as unity.

$$X = \cos \theta \cos \phi$$
$$Y = \sin \theta \cos \phi$$
$$Z = \phi$$

The term $\sin \phi$ or Z is solved with the resolver R1 in Figs. 4 and 9, while the terms $\cos \theta \cos \phi$ and $\sin \theta \cos \phi$ are solved by the component solver R2 in Figs. 3 and 9. As shown in Fig. 9, the component solver R2 has an inputs the value $\theta$ and also the value $\theta + \phi$ obtained from the adder 3 which has both $\theta$ and $\phi$ as inputs.

By integrating the feed rate with values proportional to the components above described and shown in Fig. 8, the tool or other driven element is caused to follow a path in space in accordance with digital input data appropriate to those angles. The X and Y machine drives are indicated in Fig. 5 while the Z machine drive is indicated in Fig. 6, as will be described in detail later.

The above general statement of the matter is given at this point in order to describe the invention in general terms, and in connection therewith the following general description may also be considered, in order to further show the relation between this case and the corresponding two-dimensional case S. N. 557,035 referred to above.

That two-dimensional case describes and claims three basic parts as follows:

(1) The command unit of Fig. 1 which determines continuously varying values of angle $\theta$ at shaft 4 from decimal, digital inputs D3 of slope, D4 of curvature, D5 of rate of change of curvature and D2 of feed rate.

(2) The resolving unit which operates on the values of angle $\theta$ and values of the feed rate to determine the X and Y coordinates in terms of the angular position of the shaft corresponding to shaft 4 in Fig. 1.

(3) The driving unit similar to present Fig. 5, which converts the X and Y shaft instructions to coarse, medium and fine electrical signals which in turn cause the machine elements to servo to the correct positions.

Generally speaking, the two-dimensional case has been extended to three dimensions as disclosed and claimed herein by making the following improvements:

(1) *Command unit.*—The command unit includes not only the command unit of Fig. 1 as described above for obtaining continuously varying values of angle $\theta$ at shaft 4, but it also includes, as shown in Fig. 2, decimal digital values and inputs D6 of slope, D7 of curvature and D8 of rate of curvature change and digital-to-analog converters controlled thereby for obtaining continuously varying values of angle $\phi$ at shaft 5.

(2) *Resolving unit.*—As above described in connection with Fig. 8, taking the tool path as unity, its component $Z = \sin \phi$ is obtained with a conventional resolver R1 in Figs. 4 and 9, while its other components $X = \cos \theta \cos \phi$ and $Y = \sin \theta \cos \phi$ are obtained with the resolver R2 in Figs. 3 and 9. The resolver R2 is an improved component solver provided by the present invention, and while a detailed description of this mechanism will be given later, at this point it may be noted that this resolver R2 is a combination of three devices, namely:

(*a*) A sine-cosine mechanism.

(*b*) A planetary differential, in that the outer frame 6 is driven about its axis at angle $\theta$ (by pinion 7 which drives gear 8 on frame 6) frame 6 having a ring gear 9 having inwardly extending teeth 10 which mesh with the teeth 11 on planetary gear 12 which rotates about its axis and having a rotary support 13 at the outer end of a crank 14, the inner end of crank 14 being fixed to shaft 15 which rotates on the axis of frame 6 at angle $\theta + \phi$. The sum of $\theta$ and $\phi$ is the output of adder 3 in Fig. 9 and also Fig. 3, the latter showing this adder as a differential gear unit having inputs of θ from shaft 4 in Fig. 1 and φ from shaft 5 in Fig. 2.

C. A resolver, in that the sliders 16 and 17 have slots 18 and 19 of a Scotch yoke mechanism 20 applied to the crank pin 21 on gear 12 which rotates inside of ring gear 9.

(3) *Driving unit.*—In addition to the drives for the X and Y machine elements as in Fig. 5, the invention adds a drive for the Z machine element as in Fig. 6.

The invention will be described in further detail under the following headings, which represent various components of the machine control method and system; the command unit of Fig. 1, command unit of Fig. 2, component solver of Fig. 3, resolver of Fig. 4, the X and Y driving unit of Fig. 5 and the Z driving unit of Fig. 6. Before taking up these headings, a description will be given of the feed rate as this forms an input to Figs. 1 to 4 inclusive.

Feed rate

In Fig. 1, the input D2 supplies a decimal digital input of feed rate to the analog feed converter 24 which supplies a voltage as disclosed in S. N. 557,035 for comparison with the voltage of tachometer 25 driven by feed rate motor M1. The servo indicated at 26 drives the motor M1 at such a rate that the difference between the voltage generated by the stepping switch conversion circuit, not shown, of the converter 24 and the tachometer 25 is essentially zero.

The feed rate motor M1 drives the feed rate shaft FR which in Fig. 1 is also an input indicated at FR3 to the variable gear ratio VG1, described later and also an input indicated at FR4 to the ball-disk-cylinder integrator BDC1, described later.

As shown in Fig. 3, the feed rate FR is also an input indicated at FR40 to the ball-disk-cylinder integrator, BDC2 and an input FR5 to the ball-disk-cylinder integrator BDC3, these integrators, as later described, being controlled by the sliders 16 and 17 of resolver R2, pertaining to the X and Y machine elements.

As shown in Fig. 4, the feed rate FR is an input FR6 to the ball-disk-cylinder integrator BDC4 in the output of resolver R1 and pertaining to the Z machine element.

As shown in Fig. 2, the feed rate FR is also an input FR7 to the variable gear ratio VG2 and an input FR8 to the ball-disk-cylinder integrator BDC5 later described.

Command unit of Fig. 1

In Fig. 1, the slope data D3 represents a decimal number in terms of angles, the curvature data D4 represents a decimal number in terms of the reciprocal of radius and the rate of curvature change data D5 represents a number in terms of speed, the speed number, as described and claimed in S. N. 557,035 being in a system of numeration having a radix of 2 to the Nth power, where N is an integer here shown as 3, the system being octal.

The slope θ of the component 2 in the X, Y plane of the tool path 1, see Fig. 8, depends upon the ratio of the feed rates of the corresponding X and Y machine elements of Fig. 5. This ratio is established with a single datum of input information D3. This is accomplished by positioning the shaft 4 in Fig. 1 in accordance with the slope data D3 and by resolving the angular position of the feed rate resolver R2 in Fig. 3 into cofunction controls in space quadrature, by operating the ball slides 27 and 28 of resolver R2 as inputs for the integrators BDC2 and BDC3 to establish the feed rates at shafts S11 and S12, Fig. 3, to establish the feed rate ratio on the X and Y axes.

The resolver shaft position θ is established from input information D3 of slope angles expressed in terms of angles on a decimal basis, a digital-to-analog converter 44 being provided to convert this input to the angular position θ of shaft 4 as described and claimed in copending application S. N. 540,748, filed October 17, 1955, by R. W. Tripp, for "Automatic Shaft Control," and assigned to the assignee of the present application, that application also disclosing and claiming a computer for computing the sine and cosine values of an angle equal to the sum of the angles represented by the digits in decimally related digital groups as indicated by the input D3. Said applications also disclose and claim producing the co-function sine and cosine values of the angle in coarse and fine increments, the coarse increment being supplied to the medium resolver 29, the fine increment to the Inductosyn 30. For example, the coarse increment of sine θ may be supplied to winding 31, the coarse increment of cosine θ to winding 32, windings 31 and 32 being in space quadrature and inductively related to the relatively rotatable winding 33 having a driving connection as indicated at 34 to the relatively rotatable winding 35 of Inductosyn 30. The fine increment of since θ may be supplied to winding 36, the fine increment of cosine θ to winding 37. Windings 36 and 37 are inductively related to the relatively rotatable winding 35, the latter having a driving connection indicated at 38 to gear 39 of differential gear DG1. Gear 39 is connected by gear 40 to servo motor 41 having an amplifier 42 and controlled by a well known synchro switch 43. Motor 41 provides a shaft input to the differential gear DG1 and operates it to thereby operate resolver 29 and Inductosyn 30, in turn, to reduce to zero the error current in windings 33 and 35, whereby shaft 4 is driven to an angular position or to continuously varying positions in accordance with the data D3.

The circuit of motor 41 is controlled by a switch S1 later described.

As described and claimed in the above mentioned patent applications, the ratio of the speed rates of the driven elements on the X and Y axes is changed, as required for a circular path, i. e., part or all of a circle, with a single datum of curvature input information D4: The input D4 thus provides curvature input information on a decimal basis in terms of curvature (reciprocal of radius) and the converter 45 converts this digital data to an analog value expressed as a shaft speed for addition to the position of shaft 4 as determined by the slope control D3.

As described and claimed in S. N. 557,035, the differential gear DG2 has a spider having an output shaft S5 driven at a speed equal to the sum of the speeds of shaft S3 from the rate of curvature change and the speed of shaft S2 driven by servo motor M2. The shaft S5 is a part of the spider and it has a driving connection 46 with the slider 47 of a potentiometer 48, the servo circuit including motor M2 and amplifier 49 driving the shaft S2 and hence gears 50 and 51 and gear 52 to a position or at a speed which reduces to zero the error current determined by the difference between the potentials established by the position of slider 47 and the curvature instruction from converter 45, as set up in the input D4.

S. N. 557,035 refers to page 12 of reprint from Machine Design, August 1945 through February 1946, entitled "Designing computing mechanisms" by Macon-Fry, for a description of the differential gear like DG1 and DG2 and elsewhere; also page 30 thereof for the well-known integrator like BDC1.

Switch S10 is similar in function to switch S30, to render its servo motor M2 inactive at certain times as described later.

The shaft S5 thus in part at least is driven to a position or at a rate dependent upon the curvature instruction in the input D4. Shaft S5 operates gear 53 which operates the ball slide 54 to integrate the feed rate drive FR4 accordingly, the output S1 being added through gears 55 and 56 to the shaft 4 through the differential gear DG1.

As described and claimed in S. N. 557,035, the rate of change of curvature input data D5 is converted into analog form to provide a position or continuously varying speed values of shaft S3 which is added through differential gear DG2 to the position or speed of shaft S5, whereby the curvature instruction in shaft S5 is thus modified in accordance with the rate of curvature change instruction in the input D5. Application S. N. 557,035 points out certain advantages in having the input D5 in octal form as indicated with its conversion by converter 57 to binary form, to operate gears of VG1 in different combinations to change the speed of the feed rate input FR3 into the speed of the output shaft S3 in accordance with the instructions set up in the input D5.

Hence the $\theta$ shaft 4 in Fig. 1 is controlled by the combined effect of the instructions in all of the inputs D3, D4 and D5, whereby the combined effect of all of these instructions may be resolved into co-function space quadrature feed rates for the X and Y drives.

Application S. N. 557,035 refers to pages 31 to 33 of the above publication "Designing computing mechanism" for a description of the principle of operation of the binary gear device VG1, although said application discloses and claims an improved construction. Said application also refers to Equation 7, page 8, vol. 27, Radiation Lab. Series, published 1948 by McGraw-Hill Book Co., said equation pertaining to the speed of the output shaft of a spur gear cell in relation to the spider speed and the input shaft speed, a number of such cells being useful for operation by the binary instructions supplied to the variable gear ratio VG1.

*Command unit of Fig. 2*

Referring to Fig. 2, the circuit here shown is similar to the circuit in Fig. 1, the slope input D6, the curvature input D7 and the rate of curvature change D8 corresponding to the inputs D3, D4 and D5 respectively. The circuits and devices controlled by the inputs D6, D7 and D8 are also similar to the corresponding items in Fig. 1, with this main difference, that the inputs D6, D7 and D8 have values appropriate to positioning or driving the shaft 5 at the angle $\phi$, appropriate to the Z machine element, see Figs. 6, 8 and 9.

Accordingly, the slope data in the input D6 is converted by converter 60 into coarse and fine increments of sine and cosine values by the medium resolver 61 and the Inductosyn 62 which are driven by the servo motor 63, under control of synchro switch 64, to reduce the error current to zero, as previously described, to thereby drive shaft 5 through differential gear DG3 as called for by the slope input D6. The position or rate of shaft 5 is varied by the curvature input D7 acting through the digital-to-analog converter 68 and servo motor 65, differential gear DG4, shaft 66, ball slide 67 to integrate the feed rate FR8 and provide a shaft output S6 which is added through differential gear DG3 to the shaft 5. Also, the curvature shaft output S6 is modified in accordance with the rate of curvature change instruction in the input D8 through the addition of the shaft output S7, from variable gear ratio VG2, through differential gear DG4, to shaft 66 and the input of ball slide 67 to the integrator BDC5. The input D8 controls the digital-to-analog converter 69 which controls the variable gear ratio VG2 having the feed rate input FR7.

The servo circuits of motors 63 and 65 in Fig. 2 are controlled by switches S8 and S9, as in Fig. 1, and later described.

The $\phi$ output of shaft 5 is thus in accordance with the combined instructions in the inputs D6, D7 and D8.

*Component solver of Fig. 3*

The terms cos $\theta$ cos $\phi$ (X) and sin $\theta$ cos $\phi$ (Y) are solved by the component solver R2 in Fig. 3.

The planetary gear 12 is so mounted that it will rotate about its center 23 while being driven by shaft 15 through crank 14. Gear 12 meshes with ring gear 9, its pitch diameter being equal to ½ that of ring gear 9. Pin 21 is integral with gear 12, and is located on the pitch line. It drives the Scotch yoke having yokes or sliders 16 and 17. Ring gear 9 is itself driven about its axis 22 by pinion 7 acting through gear 8. The distance of pin 21 from axis 22 will be referred to as R.

The component solver R2 is a combination of the following three devices.

(1) As a planetary differential, if the center 23 of gear 12 is rotated about axis 22 by angle $\alpha$, and if ring gear 9 is rotated about its axis 22 by angle $\theta$, then planetary gear 12 will rotate about its own center 23 by angle $\alpha - \theta$.

(2) With ring gear 9 fixed, as planetary gear 12 is rotated about its center 23 by an angle $\phi$, pin 21 will proceed in a straight line across the diameter of ring gear 9 in such a way that its distance R from axis 22 is proportional to cos $\phi$. It can be seen that with ring gear 9 free to rotate, this proportionality still holds, with respect to ring gear 9.

(3) As a resolver, if ring gear 9 is rotated about its axis 22 at an angle $\theta$, then pin 21 will cause yokes or sliders 16 and 17 to move proportionally to R cos $\theta$ and R sin $\theta$.

By combining the above three modes, output yokes or sliders 16 and 17 can be caused to move proportionally to sin $\theta$ cos $\phi$, and cos $\theta$ cos $\phi$, as follows:

(a) Revolve center 23 about axis 22 through an angle $\theta + \phi$, by turning shaft 15. Shaft 15 is operated by the sum of angle $\theta$ from Fig. 1 and $\phi$ from Fig. 2, these values being added in the differential gear or adder 3 which supplies the sum $\theta + \phi$ as an output for shaft 15.

(b) Rotate ring gear 9 through angle $\theta$, by turning gear 7, angle $\theta$ from Fig. 1 being an input to gear 7.

(c) By differential action, planetary gear 12 will rotate about its center 23 at an angle $\alpha - \theta$, where $\alpha = \theta + \phi$, namely at an angle $\theta + \phi - \theta$ or angle $\phi$.

Therefore, pin 21 will move along a diameter of ring gear 9 proportional to cos $\phi$, or $R = \cos \phi$.

But ring gear 9 has been rotated through angle $\theta$. Therefore, by resolver action, yokes or sliders 16 and 17 move amounts proportional to R sin $\theta$ and R cos $\theta$, or sin $\theta$ cos $\phi$, and cos $\theta$ cos $\phi$, respectively, since $R = \cos \phi$.

As above described, the ball slides 27 and 28 are actuated by the slides 16 and 17 respectively to integrate the feed rate FR40 and FR5 respectively supplied to the respective integrators BDC2 and BDC3, whereby the shafts S11 and S12 are driven at rates corresponding to the X and Y components of the tool path.

*Resolver of Fig. 4*

As above described, the angle $\phi$ instruction of shaft 5 from Fig. 2 is resolved by resolver R1 and its Scotch yoke slider 70 into a linear movement proportional to sin $\phi$, slider 70 actuating the ball slide 71 of the integrator BDC4 which has the feed rate input FR6, to provide a shaft output S13 carrying a feed rate instruction in accordance with the Z component of the tool path.

*X and Y driving unit of Fig. 5*

In connection with Figs. 5 and 6 it will be explained how the invention provides a zero offset or an adjustable zero reference for the origin or reference position with respect to the X and Y orthogonal axes in Fig. 5 and the Z axis in Fig. 6 along which machine drives are relatively driven to obtain a cutting path referenced to such axes, whereby the position of each axis for the machine drive may be referred to any selected origin of coordinates, either within the machine or outside of it. This zero offset feature as applied to manual operation for two axes is described and claimed in S. N. 557,035; as applied to tool radius correction for two axes it is described and claimed in S. N. 561,769, filed January 27, 1956, by Robert W. Tripp for Tool Radius Correction Computer; as applied to tool radius correction for X, Y and Z axes in three dimensions it is described and claimed in application S. N. 608,357, filed September 6, 1956, by Robert W.

Tripp for Three-Dimensional Tool Radius Correction Computer.

Referring to Fig. 5, shaft S11 is an input to the differential gear DG5 and shaft S12 is an input to differential gear 6. The other input to each of the differential gears DG5 and DG6 is here shown in each case as a manual input Z2 and Z3 respectively, for zero offset, namely to displace the origin of the tool path. Differential gear DG5 functions as an adder whereby its output shaft S14 contains an instruction equal to the sum of the instructions in shaft S11 and the manual input Z2. Similarly, shaft S15 contains an instruction equal to the sum of the instruction in shaft S12 and in the manual input Z3, differential gear DG6 also operating as an adder for this purpose. Shaft S14 is an input to the electrical resolver R30 and shaft S15 is an input to the electrical resolver R40.

Resolver R30 has a single winding 302 rotatable relatively to its quadrature windings 300 and has a repeating cycle of once per revolution, while the fine data element 318, here shown as an Inductosyn, has a large number of poles per inch such as 20, with a repeating cycle of 0.1 inch. Inductosyn 318 has a scale S18 and a slider S19 having quadrature windings in circuit with the windings 300 of resolver R30. The linear X position of the servo motor M3 is controlled by the fine error signal in line 308 from the scale S18, by the medium error signal in line 306 and by the coarse error signal in line 307. The fine error signal in line 308 is always active, while the coarse and medium error signals are available on command by operating switch 401 to operate the relay 400. All three error signals operate at so called different "speeds" or under control of switch SW2, which is similar to switch 43 in Fig. 1, switch 64 in Fig. 2, and switch SW3 in Fig. 6; see page 84, vol. 25, of "Radiation Laboratory Series," pub. 1948 by McGraw-Hill Book Co., and vols. 17, 21 and 27 of the same series for reference to synchro and electrical resolver technique which may be used.

The resolver R31 is similar in construction to resolver R30 and it functions as a synchro transmitter, serving as a medium data element and having a single winding 329 and quadrature windings 319. Its quadrature windings 319 supply sine and cosine values, depending upon its angular position, to the quadrature windings 320 of a similar resolver R32 which serves as a synchro receiver. Resolver R32 has a winding 321 which supplies an error signal to the line 306 when relay 400 is active, and depending upon the desired X position established by operation of the handle or input Z2.

The coarse data element 322, here shown as a potentiometer, has a slider 323 connected to one end of a transformer primary winding 324, while the slider 325 of the coarse data receiver potentiometer 326 is connected to the other end of that winding, whereby the secondary winding 327 supplies to the line 307 an error signal depending upon the discrepancy if any, between the coarse position set up by the input Z2 and the coarse position assumed by the machine element such as a carriage which is driven by the nut 179.

A reference source of voltage 304 energizes windings 329 and 302, as well as the potentiometers 322 and 326. Shaft S14 drives resolver R31 through a 10 to 1 gear ratio 330, this drive also operating potentiometer 322 as indicated by shaft 331. The motor shaft 184 drives resolver R32 through a 10 to 1 gear ratio 352, this drive also operating potentiometer 326 as indicated by shaft 332. Suitable gear ratios not shown may be employed in the shafts like 331 and 332, whereby the various mechanical linkages provide scale factors in the ratio of 100 in. to 10 in. to 0.1 in. for the coarse, medium and fine data elements like 322 and 326, R31 and R32, R30 and 318 respectively.

The "Y" position control in Fig. 5 is similar to that above described for the "X" position, corresponding elements being shown. To describe this briefly, the differential gear DG6 adds the manual instruction Z3 to the instruction in shaft S12 to operate shaft S15 which operates the coarse data transmitter element 309, the medium data transmitter resolver R33 and the fine data transmitter resolver R40 which in turn operate their corresponding coarse, medium and fine receivers, 310, R34 and 328. The error current from these receiver elements operates synchro switch SW4 to operate motor M4 which operates screw 181 to drive nut 180 according to the Y component of the tool path. For three-dimensional control, a spherical tool may be used. Assuming that nut 179 drives a slide or carriage along ways in a direction parallel to the X axis, the nut 180 may be considered as driving a tool carriage on ways on the first-mentioned carriage and parallel to the Y axis.

The origin of the tool path can be established by, (a) the machine itself in motion, (b) hand cranks on the machine, or (c) zero off-set Z2, Z3, by operating the normally open relays 400 and 402 by operating their push buttons for program advance switches 401 and 403. Relays 400 and 402 control the coarse and medium circuits like 306 and 307 leading to the synchro switch SW2, and the similar circuits leading to synchro switch SW4.

After the "X" and "Y" positioning has been accomplished by operating the inputs Z2 and Z3 and by closing the switches 401 and 403, these switches are released so that the slope, curvature and rate of change of curvature information in shafts S11 and S12 take command.

Z driving unit of Fig. 6

The Z driving unit of Fig. 6 is similar to the X driving unit and also the Y driving unit of Fig. 5, the only difference being in the nature of shaft instruction input S13 which in the case of Fig. 6 contains the value $\sin \phi$ as derived from Fig. 4, whereas the X and Y inputs in Fig. 5 were derived from angle $\theta$, or rather from its co-function components in shafts S11 and S12.

In Fig. 6, the manual Z position input Z4 is added to the instruction in shaft S13, by differential gear adder DG7, resulting in shaft output S16. The instruction in shaft S16 is resolved into coarse, medium and fine increments by the data elements 336, R4 and R3 respectively which function as transmitters for the corresponding coarse, medium and fine receivers 337, R5 and Inductosyn 333, as previously described. The error current from these data elements in controlled by synchro switch SW3 to operate servo motor M5 to drive lead screw 334 and operate nut 335. Nut 335 may pertain to the tool carriage or other machine element operating on the Z axis at right angles to the plane of the X and Y axes referred to in Fig. 5. As previously described, the program advance switch or push button 341 controls relay 338 to control the medium and coarse circuits 339 and 340 to the switch SW3 as described in connection with push buttons 401 and 403 in Fig. 5.

Program advance and supervisory control of feed rate

In connection with the binary gear devices VG1 in Fig. 1 and VG2 in Fig. 2, S. N. 557,035 describes and claims the sequence of operation of the binary gear device in relation to the program advance, with transfer of the input data on the card to stepping switches (not shown here) and the transfer of the decoded binary information on the steppers to holding circuits, to make such control available for quick speed change, while releasing the steppers to receive the next data. These features as described and claimed in S. N. 557,035 include the octal-to-binary translator, differential gear ratio, and sequence of operation of the binary gear device in relation to the program advance. Such features are not being claimed here, but may be extended to three-dimensional operation as indicated herein.

As disclosed and claimed in S. N. 557,035 provision may be made for reversing the input or output of the binary gear ratio VG1 and VG2 in order to provide both negative and positive values of rate of change of curvature and a "Read-In" circuit may be provided to "Read" the punched card or tape at a relatively slow rate and during times when the previous information is being held in the double relays $2^0$ to $2^9$ on clutch coils, which makes it possible to change the information on the clutch coils very rapidly and at an accurately chosen time or under accurately chosen conditions.

The error signal circuits for motors M1, M2 and 41 in Fig. 1, also motors 65 and 63 in Fig. 2, motors M3 and M4 in Fig. 5 and motor M5 in Fig. 6 are shown as a single line, whereas a complete circuit is understood and is well known.

Concerning the general operation, it is assumed that the origin is established by operating the manual inputs Z2, Z3 and Z4, or in other manners, as above described.

It has been found unnecessary to stop the feed rate drive during the time that the slope and curvature servo motors are operating to adjust the shaft like $\theta$ shaft 4 in accordance with the current segment of the input data and accordingly such control is not disclosed herein whereby the feed rate drive is maintained in continuous operation during the time successive bits of slope, curvature and rate of curvature change input data are adding their instructions to the $\theta$ and $\phi$ shafts. The switches indicated at S30 for motor 41, at S10 for motor M2 in Fig. 1 and also at S8 for motor 63 and at S9 for motor 65 in Fig. 2 each represents a manual or program advance switch which is closed at the start of adding a new bit of input instruction, each such switch being held closed until the error current to its respective motor is null, and each such switch again being actuated manually or by the program advance when the next bit of input data is to be added to the operation.

Various modifications may be made in the invention without departing from the spirit of the following claims.

I claim:

1. The method of driving a driven element on a path, said driven element having three machine elements on mutually perpendicular axes, said method comprising supplying three dimensional input data of said path identified with respect to X, Y and Z coordinates, said path component in the X, Y plane having an angle $\theta$, and said path having an angle $\phi$ above the X, Y plane, computing continuously varying values of $\theta$ and also of $\phi$ from said data, resolving said values of $\phi$ into a control proportional to sin $\phi$, adding said values of $\theta$ and $\phi$, resolving the values of $\theta$ and the values of $\theta+\phi$ into controls proportional to cos $\theta$ cos $\phi$, and sin $\theta$ cos $\phi$, and controlling the speed of said three machine elements in accordance with said controls respectively.

2. A machine control comprising means for supplying input data characteristic of a tool path having X, Y and Z coordinates in three dimensions, means for resolving said data into shaft rotations characteristic of said X, Y and Z coordinates respectively, means for converting each of said shaft rotations to coarse, medium and fine electrical signals, a driven element, and means for servoing said driven element with said signals along a path defined by said input data.

3. A machine control having three machine elements on mutually perpendicular X, Y and Z axes, said machine control comprising means for supplying three dimensional input data of a path identified with respect to X, Y and Z coordinates, said path component in the X, Y plane having an angle $\theta$, and said path having an angle $\phi$ above the X, Y plane, separate means for computing continuously varying values of $\theta$ and also of $\phi$ from said data, means for resolving said values of $\phi$ into a control proportional to sin $\phi$, means for adding said values of $\theta$ and $\phi$, means for resolving the values of $\theta$ and the values of $\theta+\phi$ into controls proportional to cos $\theta$ cos $\phi$, and sin $\theta$ cos $\phi$ and means for controlling the speed of said three machine elements in accordance with said controls respectively.

4. The method which comprises supplying input data characteristic of a tool path having X, Y and Z coordinates in three dimensions, said data comprising feed rate data and data of at least one of the following items characteristic of said tool path, namely slope, curvature, and rate of change of curvature, and resolving said data into shaft rotations characteristic of said X, Y and Z coordinates respectively.

5. The method which comprises supplying input data characteristic of a tool path having X, Y and Z coordinates in three dimensions, said data comprising feed rate data and data of at least one of the following items characteristic of said tool path, namely slope, curvature, and rate of change of curvature, resolving said data into shaft rotations characteristic of said X, Y and Z coordinates respectively, converting each of said shaft rotations to coarse, medium and fine electrical signals and servoing a driven element with said signals along a path defined by said input data.

6. The method of driving a driven element on a path, said driven element having three machine elements on mutually perpendicular axes, said method comprising supplying three dimensional input data of said path identified with respect to X, Y and Z coordinates, said data comprising feed rate data and data of at least one of the following items characteristic of said tool path, namely slope, curvature, and rate of change of curvature, said path component in the X, Y plane having an angle $\theta$, and said path having an angle $\phi$ above the X, Y plane, computing continuously varying values of $\theta$ and also of $\phi$ from said data, resolving said value of $\phi$ into a control proportional to sin $\phi$, adding said values of $\theta$ and $\phi$, resolving the values of $\theta$ and the values of $\theta+\phi$ into controls proportional to cos $\theta$ cos $\phi$, and sin $\theta$ cos $\phi$, and controlling the speed of said three machine elements in accordance with said controls respectively.

7. A machine control comprising means for supplying input data characteristic of a tool path having X, Y and Z coordinates in three dimensions, said data comprising feed rate data and data of a plurality of the following items characteristic of said tool path, namely slope, curvature, and rate of change of curvature, and means for resolving said data into shaft rotations characteristic of said X, Y and Z coordinates respectively.

8. A machine control comprising means for supplying input data characteristic of a tool path having X, Y and Z coordinates in three dimensions, said data comprising feed rate data and data of at least one of the following items characteristic of said tool path, namely slope, curvature and rate of change of curvature, means for resolving said data into shaft rotations characteristic of said X, Y and Z coordinates respectively, means for converting each of said shaft rotations to coarse, medium and fine electrical signals, a driven element, and means for servoing said driven element with said signals along a path defined by said input data.

9. A machine control having three machine elements on mutually perpendicular X, Y and Z axes, said machine control comprising means for supplying three dimensional input data of a path identified with respect to X, Y and Z coordinates, said data comprising feed rate data and data of the following items characteristic of said tool path, namely slope, curvature and rate of change of curvature, said path component in the X, Y plane having an angle $\theta$, and said path having an angle $\phi$ above the X, Y plane, separate means for computing continuously varying values of $\theta$ and also of $\phi$ from said data, means for resolving said values of $\phi$ into a control proportional to sin $\phi$, means for adding said values of $\theta$ and $\phi$, means for resolving the values of $\theta$ and the values of $\theta+\phi$ into controls proportional to cos $\theta$ cos $\phi$, and sin $\theta$ cos $\phi$ and means for controlling the speed of said three machine elements in accordance with said controls respectively.

10. An automatic machine control system for driving a driven element along a path having a rate of change of curvature with respect to X and Y and Z orthogonal axes, said system comprising means providing input data in terms of said rate of change of curvature in the X, Y plane and separate means providing input data in terms of said rate of change of curvature above the X, Y plane, means for translating said first mentioned input data into rotary movement of a shaft, means for translating said second mentioned input data into rotary movement of another shaft, means for resolving rotary movement of said shafts into linear displacements, separate means for driving said element along said X, Y and Z axes at feed rates, and means for modifying said feed rates in accordance with said displacements, respectively.

11. The method which comprises providing feed rate drives for a tool path with reference to X, Y and Z coordinate axes, providing input data characteristic of the angle of a component of said path in the X, Y plane, providing input data characteristic of the angle of said path above the X, Y plane, computing from both of said input data factors of said feed rate, and integrating said feed rate with the factors thus computed.

12. An automatic machine tool control system comprising means providing a feed rate drive for a tool path with reference to X, Y and Z coordinate axes, means providing input data characteristic of the angle of a component of said path in the X, Y plane, means providing input data characteristic of the angle of said path above the X, Y plane, a computer responsive to both of said input data for computing factors of said feed rate, and means for integrating said feed rate with the factors thus computed.

References Cited in the file of this patent
UNITED STATES PATENTS

| | | |
|---|---|---|
| 2,512,185 | Thompson | June 20, 1950 |
| 2,640,176 | Calosi | May 26, 1953 |
| 2,660,700 | Gates | Nov. 24, 1953 |
| 2,662,413 | Gallagher | Dec. 15, 1953 |
| 2,784,359 | Kamm | Mar. 5, 1957 |